(12) United States Patent
Algaraui

(10) Patent No.: US 10,366,622 B2
(45) Date of Patent: Jul. 30, 2019

(54) SYSTEMS AND METHODS FOR COMMUNICATING WITH A DYNAMIC TACTILE PERIPHERAL OVER AN ENHANCED NETWORK WITH ENHANCED DATA PACKETS

(71) Applicant: Imam Abdulrahman Bin Faisal University, Dammam (SA)

(72) Inventor: Najah M. Algaraui, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 206 days.

(21) Appl. No.: 15/466,202

(22) Filed: Mar. 22, 2017

(65) Prior Publication Data
US 2017/0278415 A1 Sep. 28, 2017

Related U.S. Application Data

(60) Provisional application No. 62/314,129, filed on Mar. 28, 2016.

(51) Int. Cl.
| | |
|---|---|
| *G09B 7/00* | (2006.01) |
| *G09B 19/00* | (2006.01) |
| *H04L 29/08* | (2006.01) |
| *G06F 16/2457* | (2019.01) |
| *G06Q 10/10* | (2012.01) |
| *G09B 21/00* | (2006.01) |
| *H04L 12/18* | (2006.01) |
| *H04L 12/58* | (2006.01) |

(52) U.S. Cl.
CPC .......... *G09B 7/00* (2013.01); *G06F 16/24578* (2019.01); *G06Q 10/101* (2013.01); *G09B 19/00* (2013.01); *G09B 21/004* (2013.01); *H04L 12/1818* (2013.01); *H04L 12/1822* (2013.01); *H04L 51/046* (2013.01); *H04L 67/10* (2013.01); *H04L 67/22* (2013.01)

(58) Field of Classification Search
CPC ........... G06F 17/3053; G06F 16/24578; G09B 19/00; G09B 7/00; G09B 21/004; H04L 67/10; H04L 67/22; H04L 12/1818; H04L 12/1822; H04L 51/04; H04L 51/046; G06Q 10/101
See application file for complete search history.

(56) References Cited

U.S. PATENT DOCUMENTS

| 2005/0071435 | A1* | 3/2005 | Karstens | ................ H04L 29/06 709/207 |
| 2009/0254971 | A1* | 10/2009 | Herz | ..................... G06Q 10/10 726/1 |

(Continued)

*Primary Examiner* — Eddy Saint-Vil
(74) *Attorney, Agent, or Firm* — Oblon, McClelland, Maier & Neustadt, L.L.P.

(57) ABSTRACT

A dynamic collaborative communication system uses a dynamic tactile peripheral to identify collaborators for enhancing a community service and contribution platform. Processing circuitry is also configured to receive an activity description file including at least one of an education and learning category, a community service category, and a social research category from a remote device, calculate a social responsibility vector for the activity description file based on social activity parameters, and calculate an assessment vector based on a grade corresponding to an external assessment.

19 Claims, 16 Drawing Sheets

(56) References Cited

U.S. PATENT DOCUMENTS

2011/0276396 A1\* 11/2011 Rathod ............ G06F 17/30867
705/14.49
2013/0137078 A1\* 5/2013 Shustorovich ........... G09B 7/00
434/362
2016/0260336 A1\* 9/2016 Chapman ................. G09B 5/00

\* cited by examiner

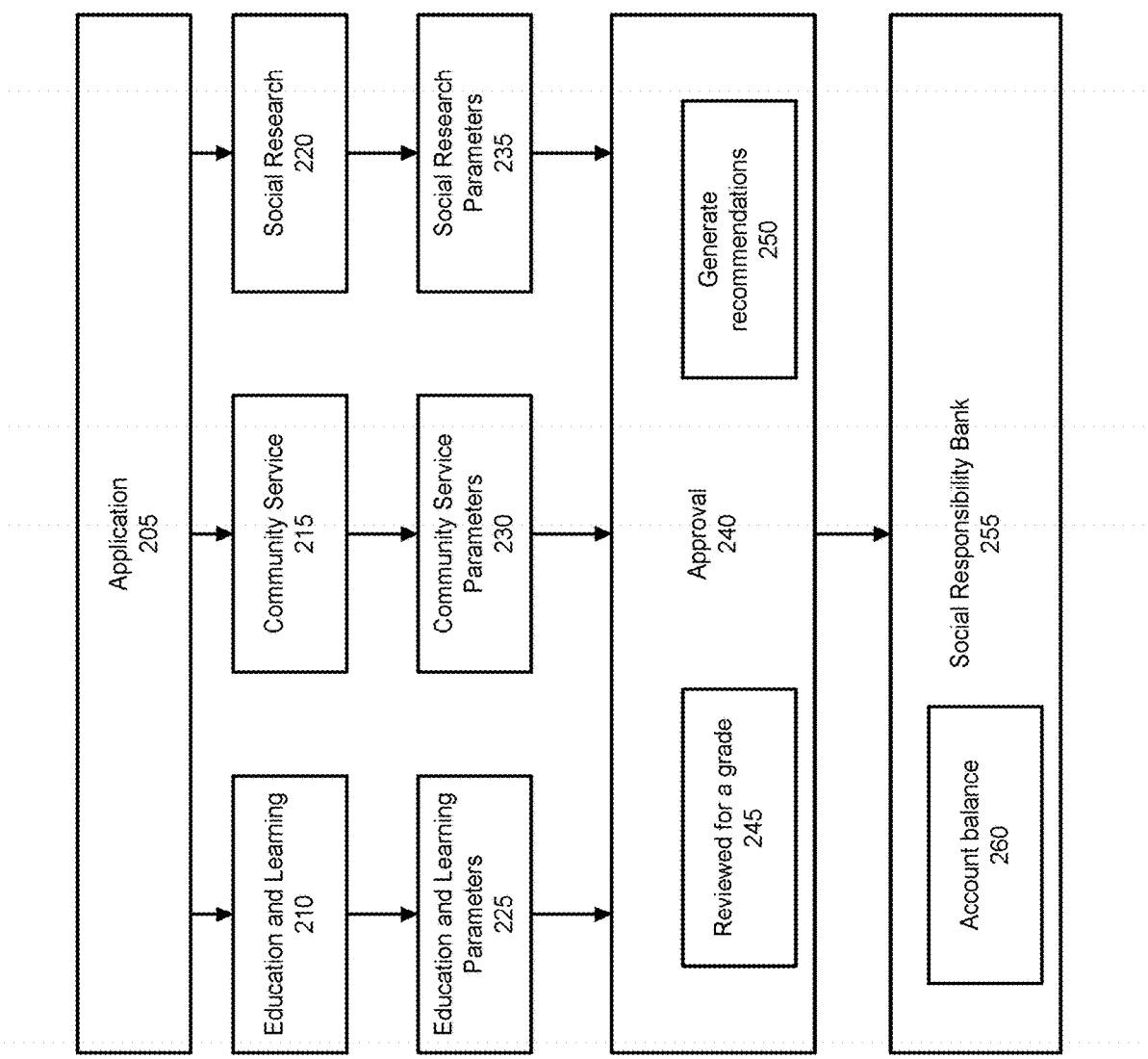

Fig. 3

| 300 | 302 | 304 | 306 | 308 | 310 | 312 | 314 | 316 | 318 | 320 | 322 |
|---|---|---|---|---|---|---|---|---|---|---|---|
| Grad Projects | Applied Projects | Student Tasks | Social Scientific Research | Field Trips | Awareness Campaign | Religious Activities | Cultural Activities | Intellectual Activities | Art Events | Sport Events | ...... |

307 (brackets grouping 300–308), 321 (brackets grouping 310–320)

Fig. 4

| 400 | 402 | 404 | 406 | 408 | 410 | 412 | 414 | 416 | 418 |
|---|---|---|---|---|---|---|---|---|---|
| Environment Studies | Economic Studies | Social Studies | Social Issues | Community Service | Community Dev. | Location of Activity | Estimated Budget | Implementation Date | ...... |

407 (brackets grouping 400–408), 421 (brackets grouping 410–416)

| Cumulative Count Presenter 1601 | ID of Presenter 1603 | ID of Candidate 1605 | Cumulative Count of Presenter and Candidate 1607 |
|---|---|---|---|

SYSTEMS AND METHODS FOR COMMUNICATING WITH A DYNAMIC TACTILE PERIPHERAL OVER AN ENHANCED NETWORK WITH ENHANCED DATA PACKETS

CROSS-REFERENCE TO RELATED APPLICATION

The present application claims the benefit of U.S. Provisional Application No. 62/314,129, filed Mar. 28, 2016, the entire contents of which being incorporated herein by reference.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Community services and contributions can be vital to a thriving society. However, members of a society are not always obligated or inclined to contribute time or money for various reasons.

SUMMARY

In an exemplary aspect, a social responsibility bank system includes a remote device and a server communicably coupled to the remote device, the server including processing circuitry configured to provide a community service and contribution platform. The processing circuitry is also configured to receive an activity description file of the community service and contribution platform including at least one of an education and learning category, a community service category, and a social research category from the remote device, calculate a social responsibility vector for the activity description file based on a plurality of social activity parameters of the activity description card, and calculate an assessment vector based on a grade corresponding to an external assessment of the activity description card. The processing circuitry is further configured to generate an activity vector based on the social responsibility vector and the assessment vector, deposit a social responsibility contribution based on the activity vector into an account of the community service and contribution platform, and output at least one of a balance of the account and a recommendation based on the social responsibility contribution at the remote device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 depicts a social responsibility banking workflow according to one or more aspects of the disclosed subject matter;

FIG. 3 depicts a data structure of the parameters that are used to characterize the Education and Learning social responsibility category according to one or more aspects of the disclosed subject matter;

FIG. 4 depicts a data structure of the parameters that are used to characterize the Social Research social responsibility category according to one or more aspects of the disclosed subject matter;

FIG. 16 depicts an exemplary data packet according to one or more exemplary aspects of the disclosed subject matter.

DETAILED DESCRIPTION

Figure 1:
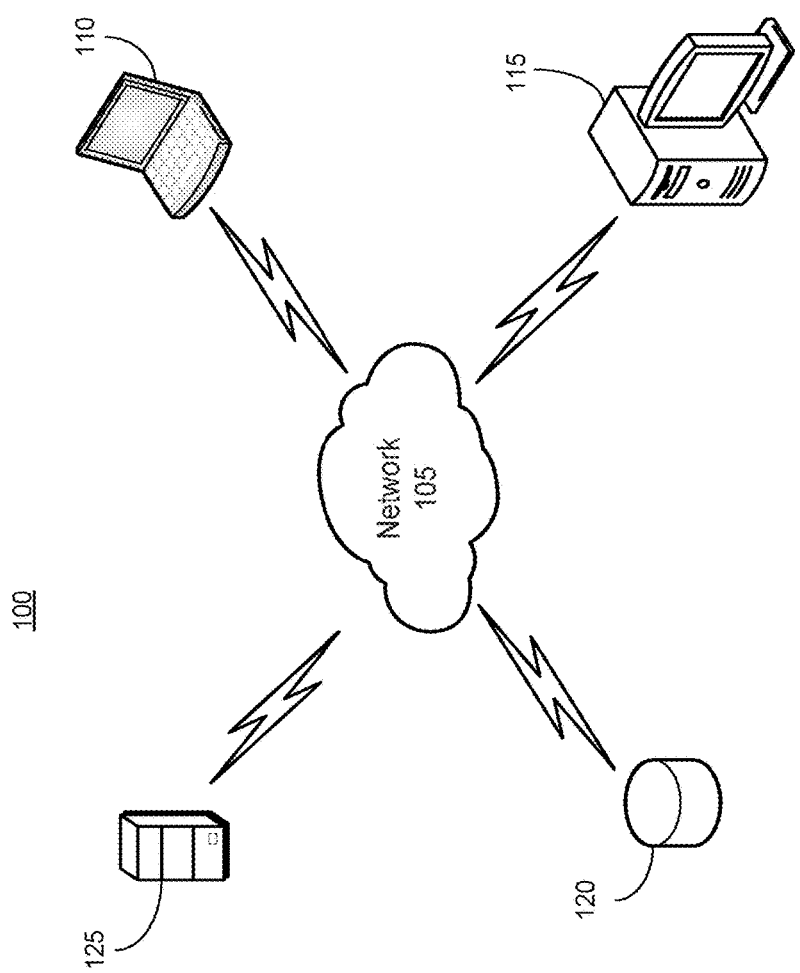
FIG. 1 depicts an exemplary schematic diagram of a system for social responsibility banking according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 depicts a social responsibility banking system 100 (herein referred to as system 100) according to one or more embodiments described herein. The system 100 can include a computer 115 connected to a server 125, a database 120, and a mobile device 110 via a network 105. The server 125 can represent one or more servers connected to the computer 115, the database 120, and the mobile device 110 via the network 105. The servers can include request networks and approval networks, for example, as further described herein. The database 120 can represent one or more databases connected to the computer 115, the server 125, and the mobile device 110 via the network 105. The mobile device 110 can represent one or more mobile devices connected to the computer 115, the server 125, and the database 120 via the network 105. The network 105 can represent one or more networks connecting the computer 115, the server 125, the database 120, and the mobile device 110.

The network 105 can be a public network, such as the Internet, or a private network such as an LAN or WAN network, or any combination thereof and can also include PSTN or ISDN sub-networks. The network 105 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computer 115 can include an interface, such as a keyboard and/or mouse, allowing a user to input parameter data, for example. The computer 115 may be a remote device associated with an approver, for example, as further described herein. The parameter data may correspond to the selection of an activity description file and how the activity description files completed by the user, as further described herein. The parameter data input via the interface at the computer 115 can be input by selecting one or more parameters from a list of possible parameters, manually entering the parameters, or the like.

The database 120 can store various information including parameter data corresponding to input from the computer 115 and/or the mobile device 110. For example, the database 120 can store parameter data, previously submitted activity description cards, and the like as further described herein.

The server 125 can receive signals from the computer 115 and/or the mobile device 110 to cause the server 125 to operate the social responsibility banking system 100, as further described herein.

FIG. 2 depicts a social responsibility banking workflow according to one or more embodiments of the disclosed subject matter. An application 205 can be submitted via a remote device, such as the computer 115 and/or the mobile device 110. The application 205 can be submitted for various social responsibility categories including Education and Learning 210, Community Service 215, and Social Research 220. For example, the application 205 allows a member of the community to submit a proposal for a project, such as a community service project, that may benefit the Community Service 215 category by proposing the details of the project including a budget, participants, dates of the project, and the like. An application 205 can be submitted directly to a social responsibility category via a predetermined activity description file filled out by the user, or the system 100 can determine the social responsibility category with which the activity description file most closely corresponds based on the parameters identified in the activity description card.

The parameters, such as the details of the project, proposed budget, time frame, and the like, from the activity description file can correspond to a social responsibility category including education and learning parameters 225, community service parameters 230, and social research parameters 235. Each category's parameters can be stored in the database 120, and, optionally or additionally, can include various weights corresponding to the importance of the parameter within its respective social responsibility category.

After identifying the parameters of the activity description card, the activity description file can be viewed for approval 240. The approval process can include one or more approval steps. Each step of the approval process can include one or more third party reviews, such that each activity description files reviewed for a grade 245, thereby designating a grade for the submitted activity description card. Optionally, or additionally, the grade can be weighted based on the approval step. For example, the first approval step may be a third party review where the reviewer is of lower rank or reputation which can correspond to a lower weight, whereas a heavier weight may be applied to the grade of the director of the social responsibility category. Further, approval 240 can include generating recommendations 250. For example, should the activity description file fail to be approved (i.e., receive a grade lower than a predetermine threshold), then the server 125 can recommend one or more of submitting an activity description file (e.g., resubmitting an improved activity description card, submitting a supplemental activity description card, etc.) and increasing an account balance 260.

Once approved, the submitted project, based on the activity description card, can be carried out. Optionally, or additionally, the completed project may also be reviewed and undergo an approval process. The completed project may correspond to a social responsibility contribution, and the social responsibility contribution can correspond to social contribution currency stored in the social responsibility bank 255 as the account balance 260. For example, completion of a first project may correspond to a social contribution of 60, and completion of a second project may correspond to a social contribution of 40, thereby resulting in an account balance of 100 in the social responsibility bank 255. The account balance 260 in the social responsibility bank 255 may be required to be equal to or above a predetermined threshold within a predetermined amount of time, wherein the account balance 260 can be increased through successful completion of projects submitted via activity description cards, a bartering system where those with a surplus account balance can trade with those who are deficient in meeting the predetermined threshold for tangible goods including computers, lab equipment, use of facilities, etc., and the like, as further described herein.

FIG. 3 depicts a data structure of the parameters that are used to characterize the Education and Learning social responsibility category according to one or more embodiments of the disclosed subject matter. Each of the parameters is used to characterize the social responsibility category. The Education and Learning parameters may vary depending on how the activity description file was filled out. With respect to FIG. 3, each of the components will now be discussed with respect to typical parameters that can be part of a social responsibility vector, the social responsibility vector for the activity description file being calculated based on a plurality of social activity parameters (e.g., Education and Learning parameters) from the activity description card. Parameter 300, P1, relates to a graduate student project. The values for parameter P1 range between 0 and 1, and an example breakdown of how the values are mapped into the number of years required for the project is shown in TABLE 1. While the values are shown to range between 0 and 1, this has been done as a matter of convenience to normalize the impact of each attribute. Other ranges of values may be used as well, perhaps even without each attribute having a same range so that some attributes may be weighted more heavily than others. In TABLE 1, a graduate student pursuing a project that will require two years of work may be equivalent to a master's degree, and a project taking longer than 4 years may be equivalent to a PhD.

TABLE 1

| Education and Learning Parameter, P1, 300 | Graduate Student Projects (years) | Value Range 0 to 1 |
|---|---|---|
| P1, 300 | 2 (Masters) | .4 |
|  | >4 (PhD) | 1 |

Parameter 302, P2, includes applied projects. Example values of P2 are shown in TABLE 2 below. Applied projects may be specialized projects in which a student can gain a deeper understanding of educational content, the applied project being above and beyond the standard curriculum (e.g., book report, science project, etc.)

TABLE 2

| Education and Learning Parameter, P2, 302 | Applied Projects (# per year) | Value Range 0 to 1 |
|---|---|---|
| P2, 302 | 2-4 | .3 |
|  | 5-8 | .6 |
|  | >8 | 1 |

Figure 5:
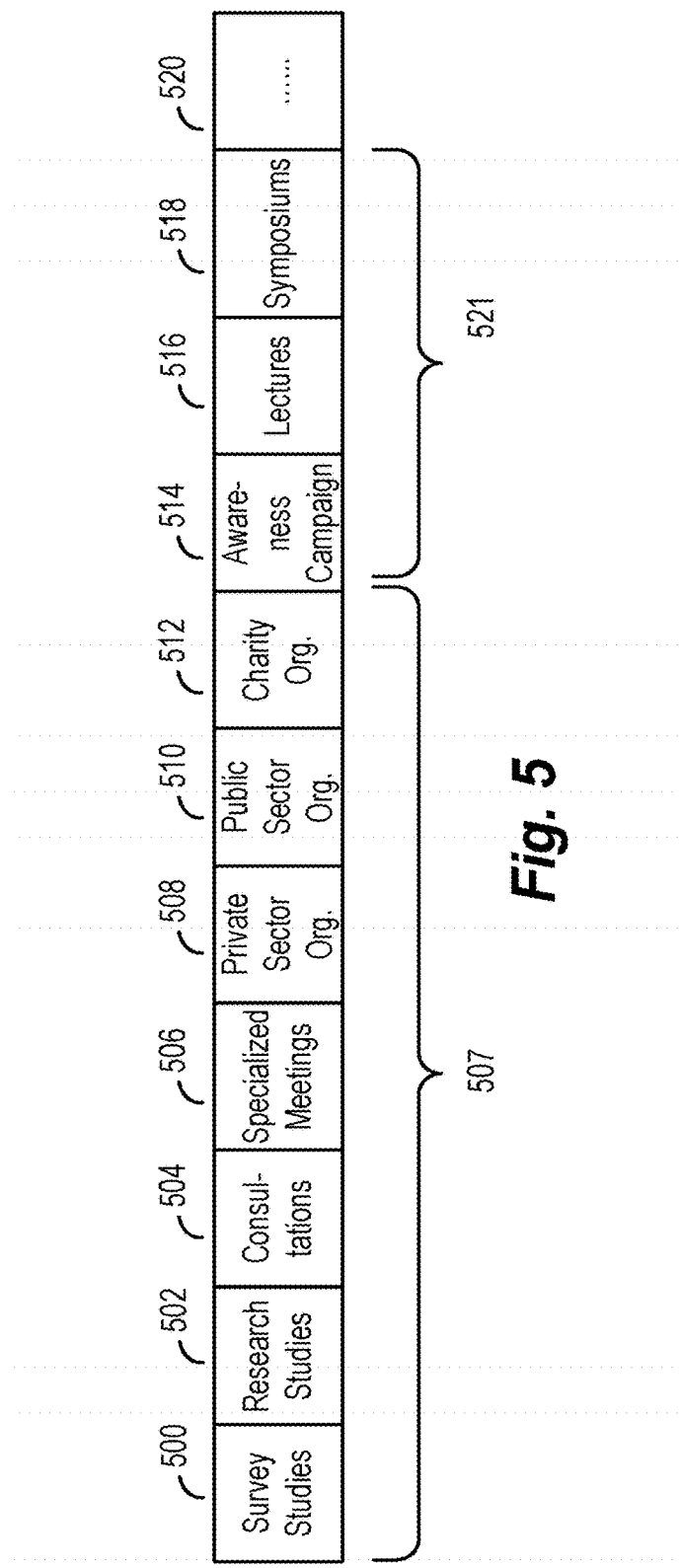
FIG. 5 depicts a data structure of the parameters that are used to characterize the Community Service social responsibility category according to one or more aspects of the disclosed subject matter.

In addition to P1 and P2, the Education and Learning social responsibility category can include Student Tasks 304, Social Scientific Research 306, Field Trips 308, Awareness Campaigns 310, Religious Activities 312, Cultural Activities 314, Intellectual Activities 316, Art Events 318, Sport Events 320, and expansion parameter 322 which can include various parameters applying to the Education and Learning social responsibility category. Each parameter can include a table, such as TABLE 1 and TABLE 2, which further characterizes each value, thereby further defining the social responsibility vector. Additionally, within the Education and Learning social responsibility category, parameters 300 through 310 can be within a sub-category of Social Curricular Activities 307, while parameters 312 through 320 can be within a sub-category of Social Extracurricular Activities 321. The sub-categories 307 and 321 can have predetermined values with a predetermined range, as well as predefined weights associated with each sub-category to further define the social responsibility vector. FIG. 4 and FIG. 5 similarly describe data structures that characterize parameters for Social Research and Community Service, respectively.

FIG. 4 depicts a data structure of the parameters that are used to characterize the Social Research social responsibility category according to one or more embodiments of the disclosed subject matter. The social activity parameters of the Social Research social responsibility category include Environment Studies 400, Economic Studies 402, Social Studies 404, Social Issues 406, Community Service 408, Community Development 410, Location of Activity 412, Estimated Budget 414, Implementation Date 416, and expansion parameter 418, which can include various parameters applying to the Social Research social responsibility category. Each parameter can include a table, such as TABLE 1 and TABLE 2, which further characterizes each value, thereby further defining the social responsibility vector. Additionally, within the Social Research social responsibility category, parameters 400 through 406 can be within a sub-category of Social Studies 407, while parameters 408 through 416 can be within the sub-category of Social Researches 421. The sub-categories 407 and 421 can have predetermined values with a predetermined range, as well as predefined weights associated with each sub-category to further define the social responsibility vector. Further, it should be appreciated that parameters 412, 414, and 416, corresponding to Location of Activity, Estimated Budget, and Implementation Date, respectively, can be applied to each social responsibility category. Each of parameters 412, 414, and 416 can correspond to the same values across each social responsibility category, include different ranges depending on the social responsibility category, and/or include weights based on the social responsibility category.

FIG. 5 depicts a data structure of the parameters that are used to characterize the Community Service social responsibility category according to one or more embodiments of the disclosed subject matter. The social activity parameters of the Community Service social responsibility category include Survey Studies 500, Research Studies 502, Consultations 504, Private Sector Organizations 508, Public Sector Organizations 510, Charity Organizations 512, Awareness Campaigns 514, Lectures 516, Symposiums 518, and expansion parameters 520, which can include various parameters applying to the Community Service social responsibility category. Additionally, parameters can further include workshops, conferences, and exhibitions, for example. Each parameter can include a table, such as TABLE 1 and TABLE 2, which further characterizes each value, thereby further defining the social responsibility vector. Within the Community Service social responsibility category, parameters 500 through 512 can be within a sub-category of Development Projects 507, while parameters 514 through 518 can be within a sub-category of Community Service Events 521. The sub-categories 507 and 521 can have predetermined values with a predetermined range, as well as predefined weights associated with each sub-category to further define the social responsibility vector.

Figure 6:
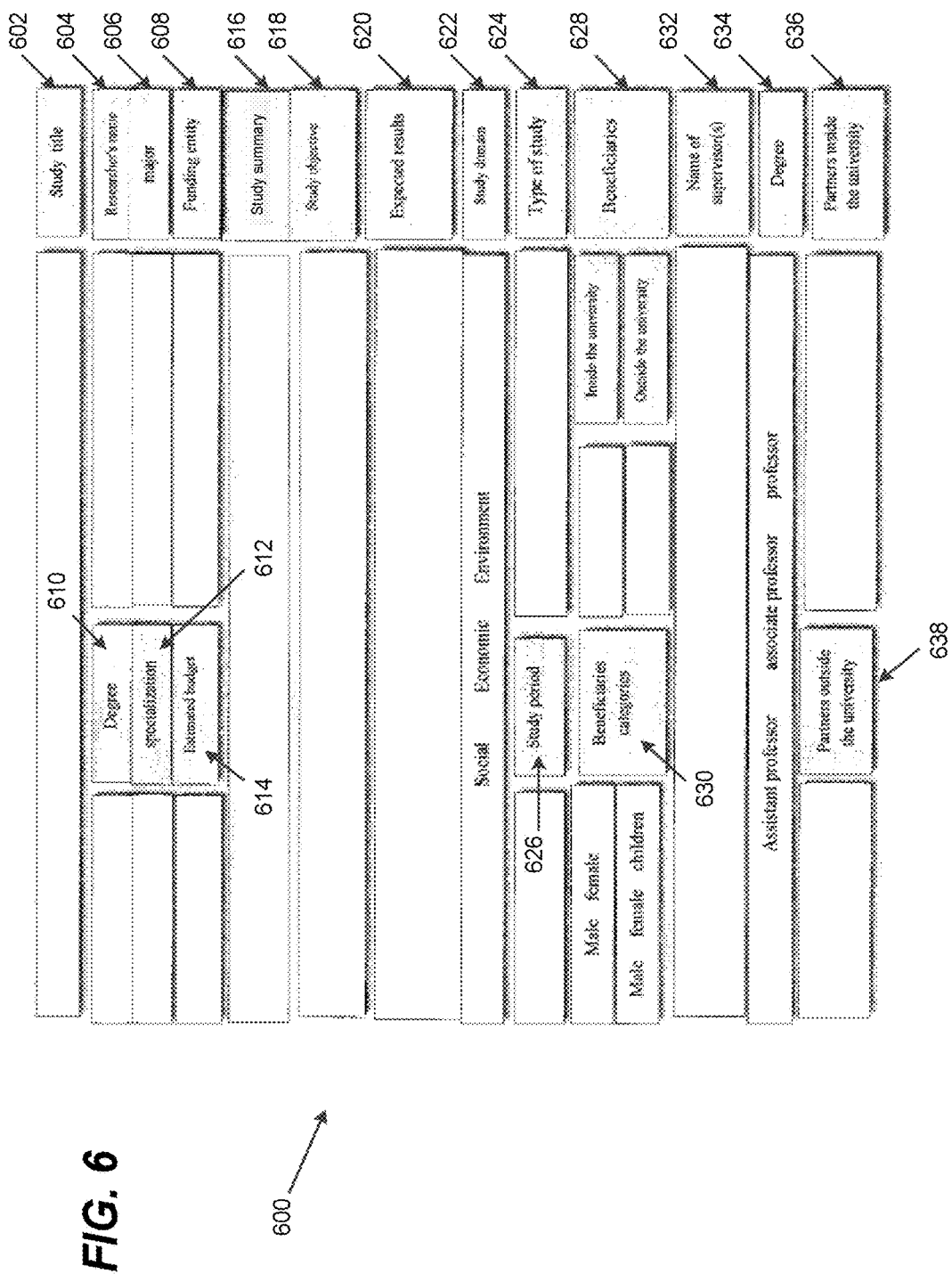
FIG. 6 is an exemplary activity description file interface according to one or more aspects of the disclosed subject matter.

FIG. 6 is an exemplary activity description file interface 600, according to certain aspects. The activity description file interface 600 describes a template for providing community services and contributions via an e-platform at a remote device, such as the computer 115 and/or the mobile device 110. The activity description file interface 600 can include an array of content pertaining to an individual activity or submission. In some aspects the activity description file interface 600 is universal for all submissions. In other aspects, the activity description file interface 600 may be tailored to fit the specific parameters of each submission. As such, the activity description file interface 600 can include multiple variations based on the requested information and any corresponding dropdown menus. The variations of the activity description file interface 600 can pertain to categories including an education and learning category, a community service category, a social research category, and the like.

The activity description file interface 600 can include a study title 602, a name of the researcher 604, a major of the researcher 606, and a funding entity. The basic information of the activity description file interface 600 can further include a degree of the researcher 610, a specialization 612, and an estimated budget 614. In some aspects, the various required information of the activity description file interface 600 can be utilized to determine a grade of the activity description diluvia an external assessment.

The activity description file interface 600 can further include a study summary 616, a study objective 618, and expected results of the study 620. The interface 600 can include a selected study domain 622, a type of study 624, a study period 628, beneficiaries of the study 628, and categories of the beneficiaries 630. In some aspects, the selected study domain 622 can include factors such as social, economic, environment, and the like. In certain aspects, the beneficiaries of the study 628 can include beneficiaries inside the university, beneficiaries outside the university, or both. Additionally, the categories of the beneficiaries 630 can include male, female, children, and any combination thereof.

The activity description file interface 600 can also include a portion to designate the supervisors of the study 632, the degree of each supervisor 634, partners inside the university 636 as well as partners outside the university 638. For example, the degree of each supervisor 632 can include assistant professor, associate professor, professor, and the like.

As such, the activity description file interface 600 can be utilized as a template to provide information pertaining to each study or project. The information may be further utilized to generate a report that is then to be comprehended by the processing circuitry to evaluate social responsibility parameters and/or by third parties to conduct an external assessment that results in associating a grade with each activity description card.

Figure 7:
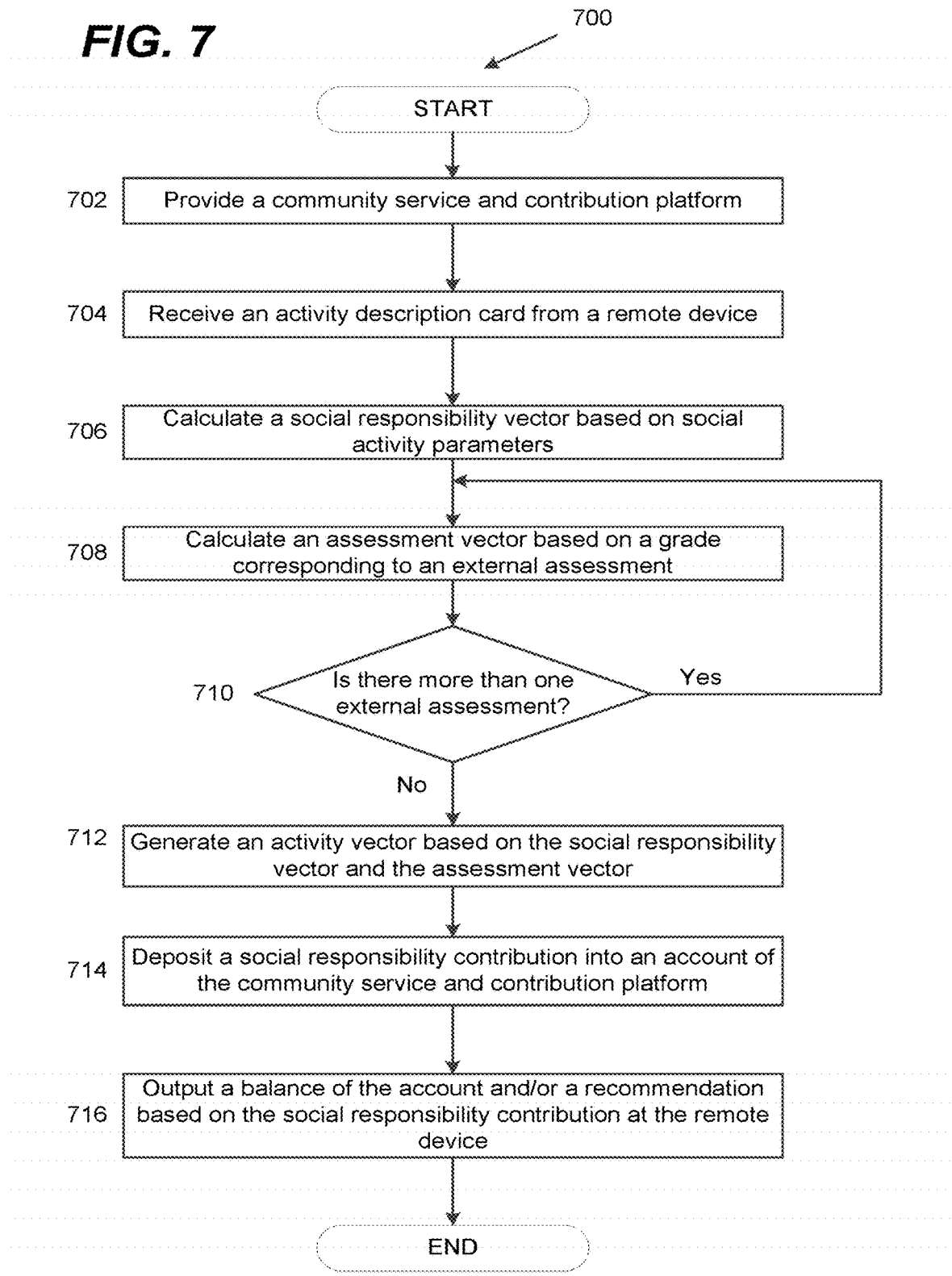
FIG. 7 is an algorithmic flowchart of a social responsibility bank process according to one or more exemplary aspects of the disclosed subject matter.

FIG. 7 is an algorithmic flowchart of a social responsibility bank process 700, according to certain exemplary aspects. The social responsibility bank process 700 describes a process of depositing community services and contributions in the form of an account balance at an e-platform. At step 702, processing circuitry of a server 125 can be configured to provide a community service and contribution platform. The community service and contribution platform can be utilized as a central location to track a plurality of account balances. The account balances can be stored and accessed via the community service and contribution platform. In some aspects, account balances can be transferred between different accounts within the community service and contribution platform.

At step 704, the processing circuitry can be configured to receive an activity description file from a remote device. The activity description file can be filled out via the community service and contribution platform. The activity description file can include information corresponding to a category of the activity description card. In certain aspects, the activity description file can include any combination of an education and learning category, a community service category, a social research category, and the like. The education and learning category can include social curricula activities as well as social non-curricula activities. The community service category can include development projects as well as community service projects. The social research category can include social studies projects as well as social research projects. The remote device can include one or more remote devices and can include a laptop, a desktop, a tablet, a smartphone, and the like.

At step 706, the processing circuitry can be configured to calculate a social responsibility vector based on social activity parameters. The social activity parameters correspond to different aspects of each activity description card. As such, the processing circuitry can determine the social activity parameters of each activity description card. The social activity parameters can include graduation projects, applied projects, students' performance tasks, social scientific researches, field trips, awareness campaigns, religious activities, cultural activities, intellectual activities, art related events, sports events, environment studies, economic studies, social studies, social issues, community service, community development, survey studies, research studies, consultations, specialized meetings, private sector organizations, public sector organizations, charity organizations, awareness campaigns, workshops, lectures, symposiums, conferences, exhibitions, location of activity, estimated budget, implementation date, and the like. The determined social activity parameters of each activity description file can be utilized by the processing circuitry to calculate a social responsibility vector. The social responsibility vector can indicate the relative scope of each proposed community service and contribution project. In some aspects, the social activity parameters of each activity description file are tallied to determine the magnitude of the social responsibility vector. In other aspects, the social activity parameters are weighted so that each social responsibility parameter can be valued individually in the social responsibility vector calculation. On the other hand, the direction of each social responsibility vector corresponds to the determined category of the evaluated activity description card. The processing circuitry can further be configured to store the social activity parameters of each activity description file for future referencing and social responsibility vector determination.

At step 708, the processing circuitry can be configured to calculate an assessment vector of the activity description file based on a grade corresponding to an external assessment. The external assessment can include a third party's review of the activity description card. The third party can review the activity description file and provide a grade based on the contents of the activity description card. In some aspects, the grade can be determined by the third party based on the social activity parameters. In other aspects, the grade can be determined based on external factors such as needed social projects, less common community services, preferred community contributions, and the like. The grade can hold a discrete value and be utilized by the processing circuitry to determine the assessment vector of the activity description card. In other aspects, the grade can be weighted based on the third party providing the external assessment. As such, the magnitude of the assessment vector corresponds to the grade of the activity description file and the direction of the assessment vector corresponds to the determined category of the evaluated activity description card. The processing circuitry can further be configured to store the grade of each activity description file for future referencing and assessment vector determination.

At step 710, the processing circuitry can be configured to determine if there is more than one external assessment. For example, two third parties may be utilized to give a particular activity description file grade. The first third party can include a professor and the second third party can include a Dean of a college. The first grade of the professor may be less weighted, whereas the second grade of the dean may be given greater weight. As such, the first and second grades can be weighted and then utilized to determine the final assessment vector of the activity description card. If there is more than one external assessment, resulting in a "yes" at step 710, the social responsibility bank process 700 proceeds to step 708. Otherwise, if there is not more than one external assessment, resulting in a "no" at step 710, the social responsibility bank process proceeds to step 712.

At step 712, the circuitry can be configured to generate an activity vector based on the social responsibility vector and the assessment vector. The activity vector corresponds to a final evaluation of the activity description file in which the evaluation corresponds to social activity parameters as well as grades of one or more external assessments. In some aspects, the activity vector can include a result of a cross product of the social responsibility vector and the assessment vector. As such, the activity vector can include a final vector that is reflective of the magnitude and direction of each of the social responsibility vector and the assessment vector.

At step 714, the processing circuitry can be configured to deposit a social responsibility contribution into an account of the community service and contribution platform. The account of the community service and contribution platform can be identified based on the activity description via a unique identifier such as a login, a username, a particular entity, and the like. The social responsibility contribution can be determined based on the activity vector of the activity description card. As such, the social responsibility contribution indicates a value of the proposed activity of the activity description file as determined by the social parameters of the activity as well as the external assessments. The social responsibility contribution can correspond to social responsibility credits, social responsibility currency, social responsibility tokens, and the like.

At step 716, the processing circuitry can be configured to output a balance of the account and a recommendation based on the social responsibility contribution at the remote device. The balance can include the deposited social responsibility contribution at the community service and contribution platform. In some aspects, the balance of the account is compared to a predetermined threshold. If the balance of the account does not satisfy the predetermined threshold, the processing circuitry can be configured to provide a recommendation at the remote device.

Figure 8:
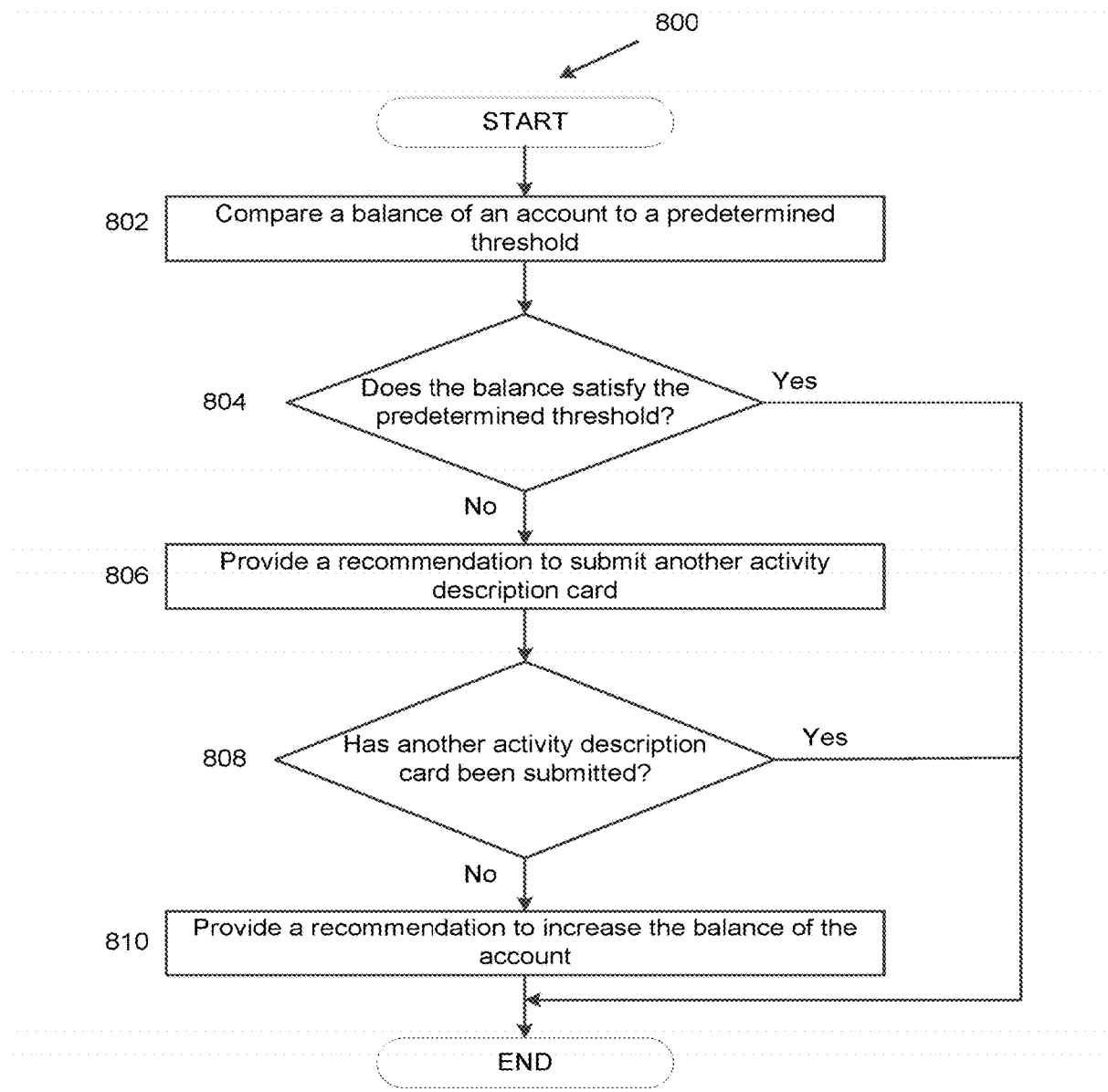
FIG. 8 is an algorithmic flowchart of a social responsibility contribution recommendation process according to one or more exemplary aspects of the disclosed subject matter.

FIG. 8 is an algorithmic flowchart of a social responsibility contribution recommendation process 800, according to certain exemplary aspects. The social responsibility contribution process 800 describes a process of comparing an account balance to a predetermined threshold, and providing a recommendation based on the comparison. At step 802, the processing circuitry of a server 125 can be configured to compare a balance of an account to a predetermined threshold. The predetermined threshold can include a predetermined balance of social responsibility contributions over a predetermined period of time. For example, the predetermined threshold can include 100 social responsibility credits annually, 25 social responsibility credits every three months, and the like.

At step 804, a determination is made of whether the balance satisfies the predetermined threshold. If the balance does not satisfy the predetermined threshold, resulting in a "no" at step 804, the social responsibility contribution recommendation process 800 proceeds to step 806. Otherwise, if the balance does satisfy the predetermined threshold, resulting in a "yes" at step 804, the social responsibility contribution recommendation process 800 ends.

At step 806, the processing circuitry can be configured to provide a recommendation to submit another activity description card. For example, the recommendation can indicate the activity description file should be resubmitted. In this instance, the activity description file may be considered unsatisfactory such that additional social activity parameters may need to be included. In another example, the recommendation can include an indication that another activity description file should be submitted. In this instance, a second activity description file may be provided to supplement the first activity description card. In another example, the processing circuitry can be configured to provide a recommendation based on previously stored activity description cards. As such, the recommendation can provide suggestions for another activity description file that includes needed social projects, less common community services, preferred community contributions, and the like.

At step 808, a determination is made of whether another activity description file has been submitted. If another activity description file has not been submitted, resulting in a "no" at step 808, the social responsibility contribution recommendation process 800 proceeds to step 810. Otherwise, if another activity description file has been submitted, resulting in a "yes" at step 808, the social responsibility contribution recommendation process 800 ends.

At step 810, the processing circuitry can be configured to provide a recommendation to increase the balance of the account. For example, the recommendation can include increasing the balance of a first account. In this instance, it may be desirable for the first account to seek a second account with which to trade for their excess account balance. As such, the first account may trade items, monetary funds, services, and the like, for social responsibility credits of a second account. In certain aspects, this cap and trade process can be utilized via the community service and contribution platform.

The social responsibility bank system provides the advantage of social responsibility sustainability in which social contributions are promoted for all members of a community. The social responsibility bank system also creates a centralized platform for social contributions in which the outlet to log activities, research, projects and the like, can be done so with ease and transparency. Additionally, the social responsibility bank is a flexible system which permits various outlets for each entity to meet their respective account balance and goals of sustainability. The social responsibility bank system ultimately provides a universal system which incorporates a variety of different outlets of social services and contributions.

Figure 9:
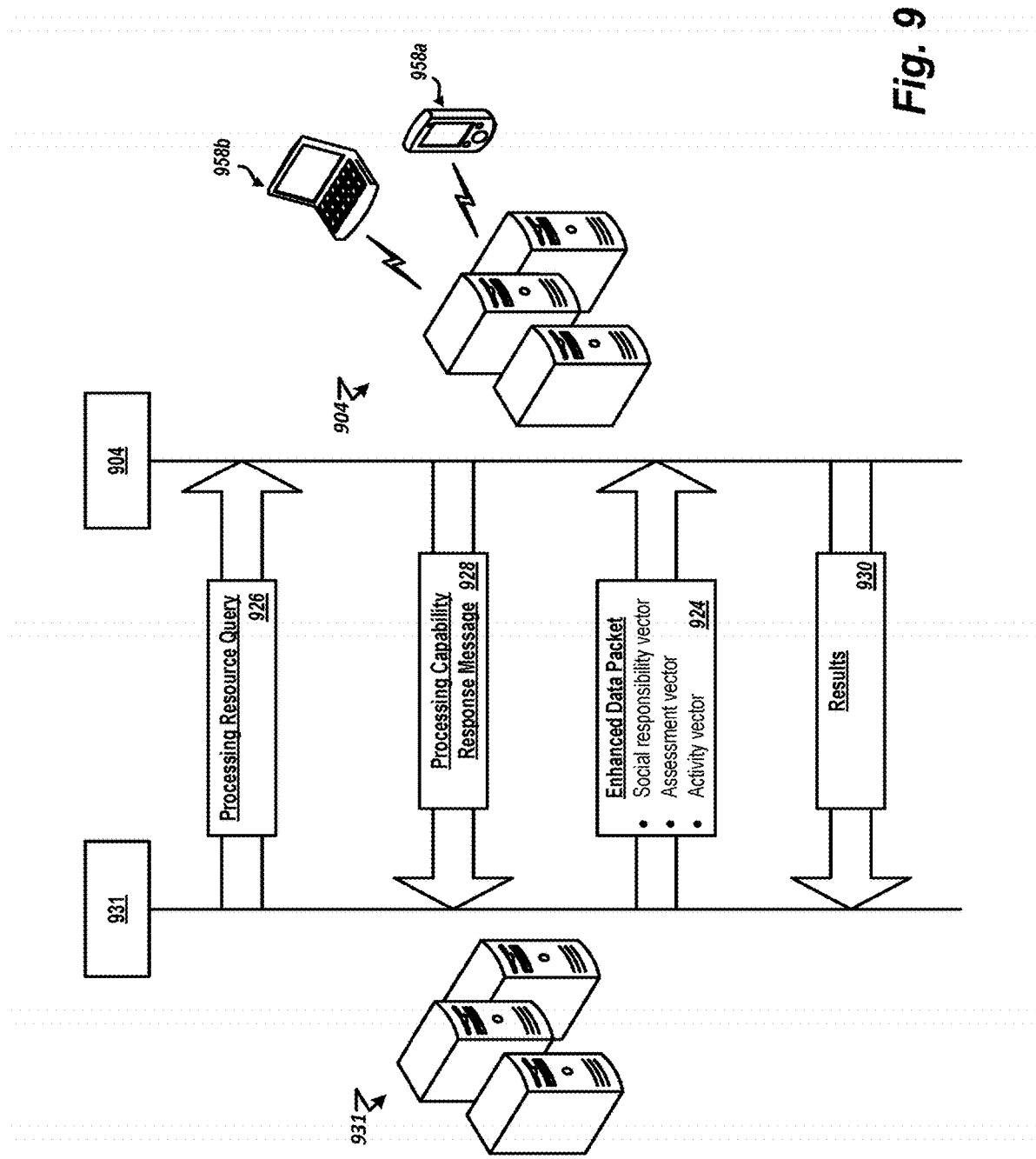
FIG. 9 is an exemplary illustration of a portion of the system for social responsibility banking according to one or more aspects of the disclosed subject matter.

FIG. 9 is an exemplary illustration of a portion of the social responsibility banking system that includes computing resources of a processing engine, such as a request approval engine 931 and computing resources of an approver network 904 that presents an approver UI screens to computing devices 958 of the approvers (e.g., Approval 240 in FIG. 2). The request approval engine 931 can be configured to perform a request routing and approval process. The request approval engine 931 can manage a flow of requests or modification request submissions through the one or more approvers (e.g., teachers, professors, deans, etc.). For example, a mathematics PhD request may be routed to the dean of the college of arts and sciences while an applied project (e.g., TABLE 2) in physics may be routed to the student's physics advisor. The approver network 904 can include approvers associated with a plurality of computing devices and databases distributed across a widely dispersed network that may be distributed across a large, international geographic area. In some implementations, the computing resources of the approver network 904 can be configured to perform various processes associated with the social responsibility banking system 100, such as the social responsibility banking process 700 (FIG. 7).

In one example, in response to determining that an amount of network or processing congestion at computing resources of the request approval engine 931 is greater than a predetermined threshold, the request approval engine 931 may transmit a processing resource query 926 to the computing resources of other networks connected to the social responsibility banking system 100, such as the approver network 904, a requester network (e.g., students submitting an activity description card), and/or an external entity network (e.g., third party grading in step 708 in FIG. 7). In response to transmitting the processing resource query to the computing resources of the other networks, the request approval engine 931 receives processing capability response messages 928 from the other networks indicating processing capabilities of the associated computing resources. Based on the processing capabilities of the computing resources associated with the connected networks, the request approval engine 931 selects the network to allocate processing resources from in order to reduce the processing burden on the request approval engine 931. In one example, the request approval engine 931 selects the computing resources from the connected network that has a greatest processing capacity. In other implementations, the request approval engine 931 selects the computing resources from the connected network based on a type of task associated with the processing engine. For example, because the request approval engine 931 performs tasks associated with presenting approver UI screens to approvers and receiving request decisions from the approvers, the request approval engine 931 may determine that the selected network is the approver network 904.

In response to selecting the approver network 904 for processing resource allocation, the request approval engine 931 transmits an enhanced data packet 924 to the approver network 904, which can also function as a command to the approver network 904 to perform the social responsibility banking process 700 or any other process associated with the request approval engine 931. For example, the enhanced data packet 924 can include at least one of one or more social responsibility vectors and assessment vectors for the requesters for a particular request or the activity vector for the request. By condensing the information associated with the request and requesters into a single data structure that is transmitted as the enhanced data packet, vast amounts of data are condensed, which reduces computer network congestions. In addition, other processing tasks associated with other processing engines of the social responsibility banking system 100 can be similarly distributed to the approver network 904 as well as the requester network and external entity network. Once the computing resources of the approver network 904 have performed the processing tasks associated with the enhanced data packet 924, the approver network 904 transmits processing task results 930 back to the request approval engine 931.

Figure 10:
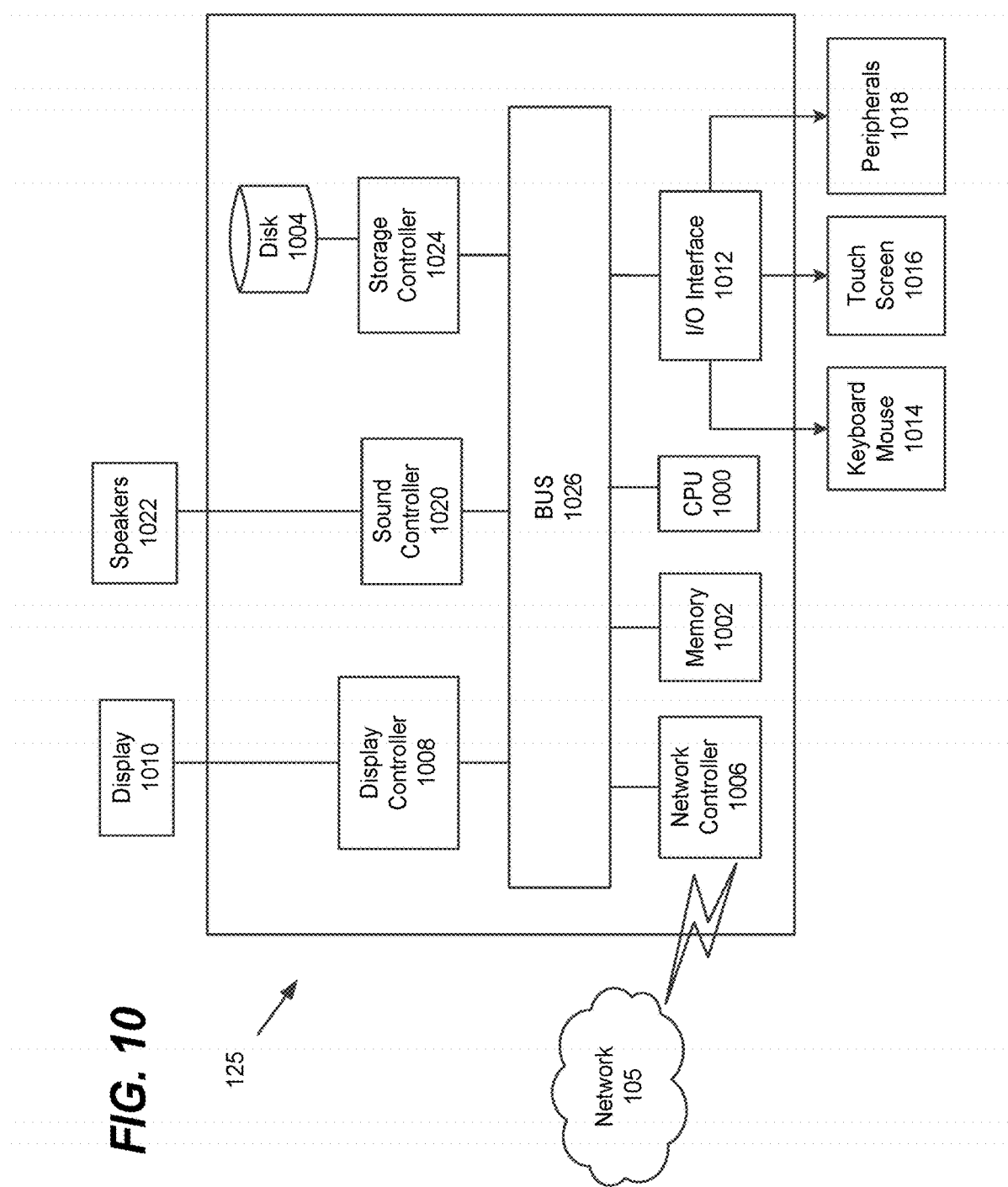
FIG. 10 is a hardware block diagram of a server according to one or more exemplary aspects of the disclosed subject matter.

FIG. 10 is a hardware block diagram of a server, according to certain exemplary aspects. In FIG. 10, the server 125 includes a CPU 1000 which performs the processes described above/below. The process data and instructions may be stored in memory 1002. These processes and instructions may also be stored on a storage medium disk 1004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 125 communicates, such as a computer or another server.

Further, the claimed advancements may be provided as a utility application, background daemon, or component of an operating system, or combination thereof, executing in conjunction with CPU 1000 and an operating system such as Microsoft Windows 7, UNIX, Solaris, LINUX, Apple MAC-OS and other systems known to those skilled in the art.

The hardware elements in order to achieve the server 125 may be realized by various circuitry elements, known to those skilled in the art. For example, CPU 1000 may be a Xenon or Core processor from Intel of America or an Opteron processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above.

The server 125 in FIG. 10 also includes a network controller 1006, such as an Intel Ethernet PRO network interface card from Intel Corporation of America, for interfacing with network 105. As can be appreciated, the network 105 can be a public network, such as the Internet, or a private network such as an LAN or WAN network, or any combination thereof and can also include PSTN or ISDN sub-networks. The network 105 can also be wired, such as an Ethernet network, or can be wireless such as a cellular network including EDGE, 3G and 4G wireless cellular systems. The wireless network can also be Wi-Fi, BLUETOOTH, or any other wireless form of communication that is known.

The server 125 further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the server 125, such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the server 125. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 11.

Figure 11:
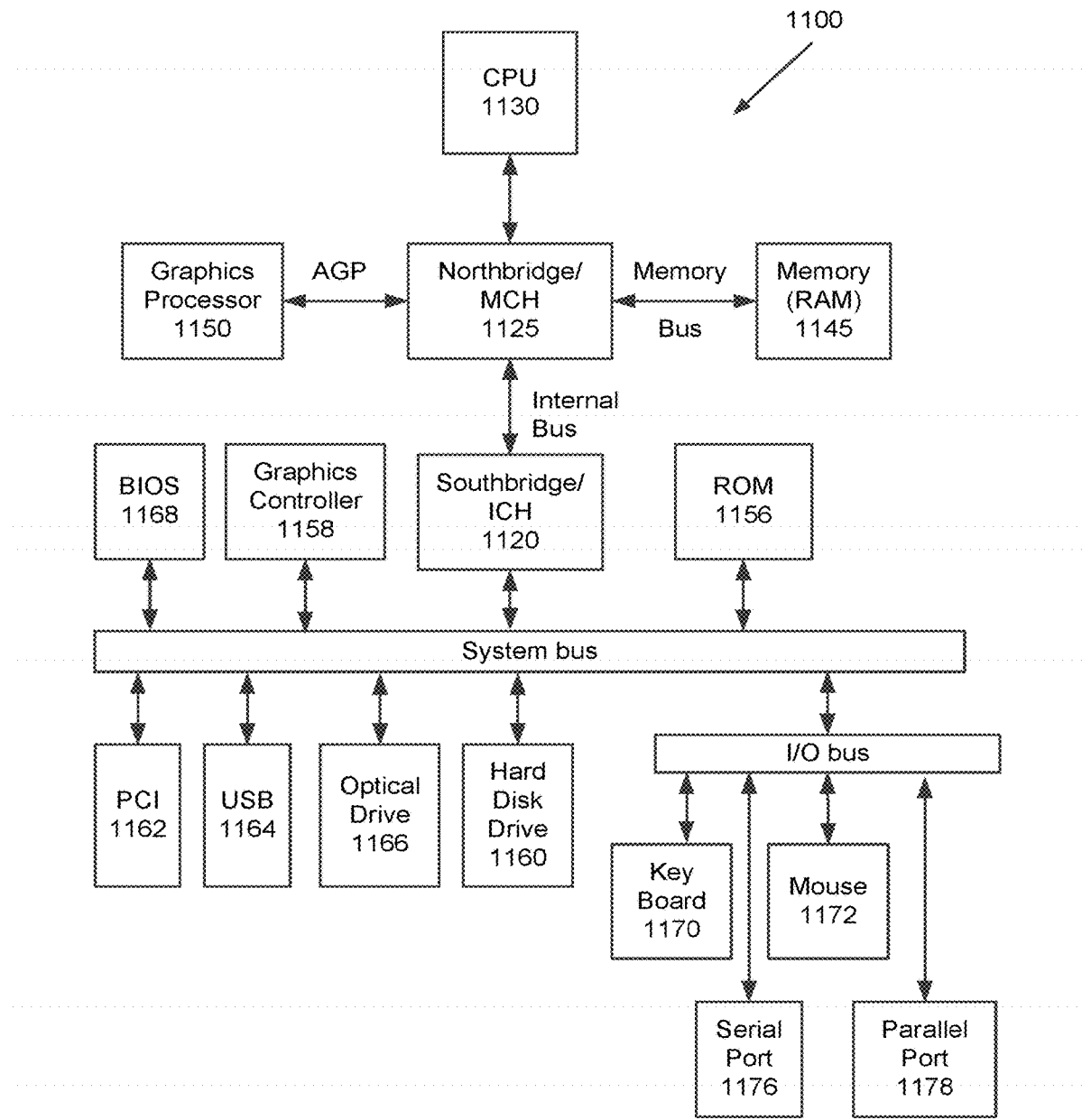
FIG. 11 is a hardware block diagram of a data processing system according to one or more exemplary aspects of the disclosed subject matter.

FIG. 11 is a hardware block diagram of a data processing system 1100, according to certain exemplary aspects. The data processing system 1100 is an example of a computer in which code or instructions implementing the processes of the illustrative embodiments may be located.

In FIG. 11, the data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
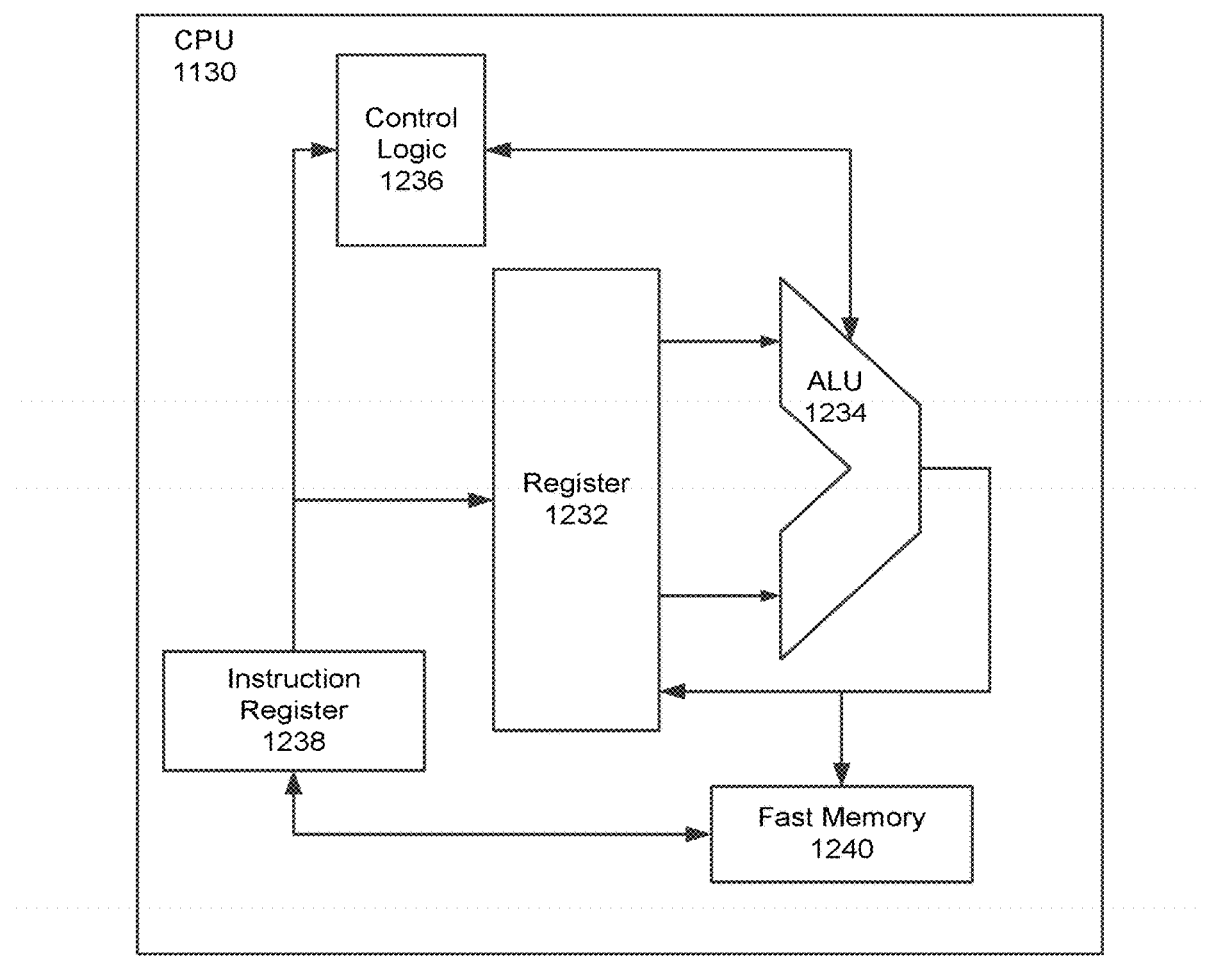
FIG. 12 is a hardware block diagram of a CPU according to one or more exemplary aspects of the disclosed subject matter.

FIG. 12 is a hardware block diagram of a CPU, according to certain exemplary aspects. For example, FIG. 12 shows one implementation of CPU 1130. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bust through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The present inventor also recognized the importance of including community input when assessing the value of candidate proposals (e.g., activity description file600). While candidate proposals are assessed and assigned a value, the assessment can be biased based on the metrics, and the weights assigned to the metrics, as applied by the assessors. Thus, the following embodiments will describe aspects of a dynamic assessment of a candidate proposal, not just from a standard assessment point of view, but by including dynamic input from the target audience while a presentation of the candidate proposal is made. Also, the presenter can receive tactile feedback from the target audience, and surreptitiously presented collaboration offers from other candidate proposals while the presentation of the subject proposal is being made. Moreover, as a presenter is making her presentation, the presenter will have a dynamic tactile peripheral in her hand (perhaps one in each hand) and receive information tactilely regarding whether someone wishes to collaborate with them, what the target audience thinks about that, and a near real-time feedback score regarding the assessed value of a combined program. The presenter may then accept the proposal during the presentation by selecting the bid of her favorite candidate collaboration proposal.

Figure 13:
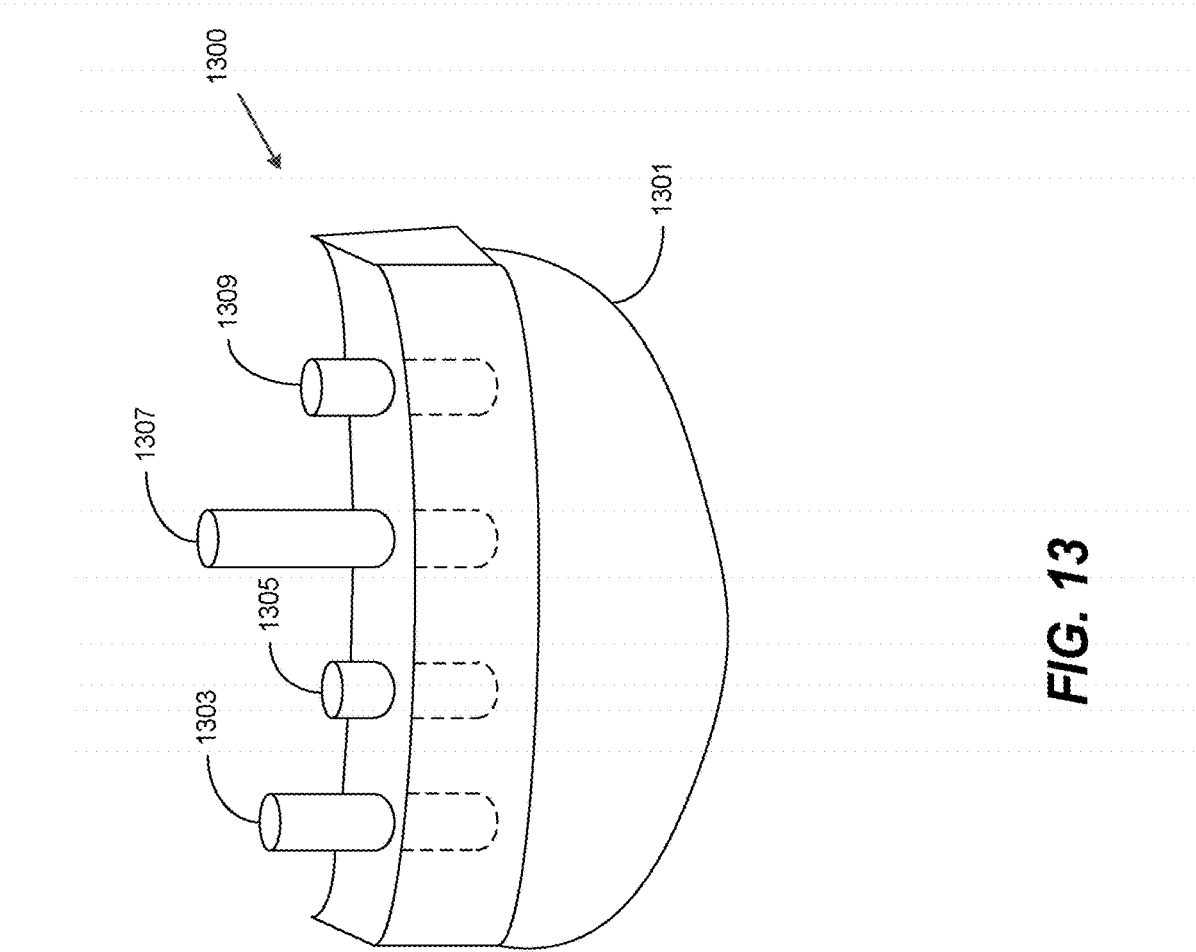
FIG. 13 is a side view of a dynamic tactile peripheral according to one or more exemplary aspects of the disclosed subject matter.

FIG. 13 is a side view of a dynamic tactile peripheral 1300, which is held in a palm of a presenter while the presenter is making a live presentation of her candidate proposal for an education program, community service program, or the like which will be assessed for a value that is attributable to the presenter's host organization. The dynamic tactile peripheral 1300 is against the presenter's palm when the presenter places strap 1301 around the backside of the presenter's hand. The portion of the dynamic tactile peripheral 1300 that contacts the presenter's palm is curved so as to be comfortable when worn. A dynamic actuator 1303 is positioned so that when it protrudes from the body of the dynamic tactile peripheral 1300, the presenter will feel how far the dynamic actuator 1303 extends beyond the surface of the body of the dynamic tactile peripheral 1300. Likewise three other dynamic actuators 1305, 1307, and 1309 are positioned to oppose the other fingers on the presenter's hand.

The dynamic tactile peripheral 1300 provides tactile information to the presenter during the presentation. This way, the presenter needs not be distracted by a visual display, nor take her eyes off of the audience when making the presentation. Furthermore, the dynamic tactile peripheral 1300 permits the presenter to receive feedback that is private to the presenter that nobody else can see during the presentation. Not only does this allow visually impaired people to fully participate in the process, but it also allows any presenter to receive personal feedback regarding how her presentation is being received by the target audience, and also receive private "collaboration bids" from other presenters who have taken the stage earlier, or who are scheduled to speak.

The presenter can pre-assign which actuators are assigned to which inputs she expects to receive. For example, the presenter may use an app or an interface (e.g., USB interface 1405 in FIG. 14) to set the predetermined actuators to particular inputs. However, in the present example, the first actuator 1303 can be set to a cumulative total social currency value that is dynamically assessed during the presentation. One aspect of the assessment is the vector analysis assessment previously discussed. However, in this collaboration environment, candidate collaborators may propose to join programs with the presenters' program. The joint program can benefit the presenter's program in several ways. First, the vector analysis might produce more than an additive value for the two proposals if the target audience provides high favorability to the joined proposal. Also, the candidate collaborator can offer some of its assessed value to the presenter as they believe the collaboration opportunity is worth the expense of providing some of its stored currency to the presenter. The presenter will be able to determine the magnitude of the cumulative proposal by feeling the height of the first actuator 1303 during the presentation. The presenter will also be able to feel how far each of the actuators 1305, 1307 and 1309 protrude, where each actuator is associated with a candidate collaborator.

Figure 14:
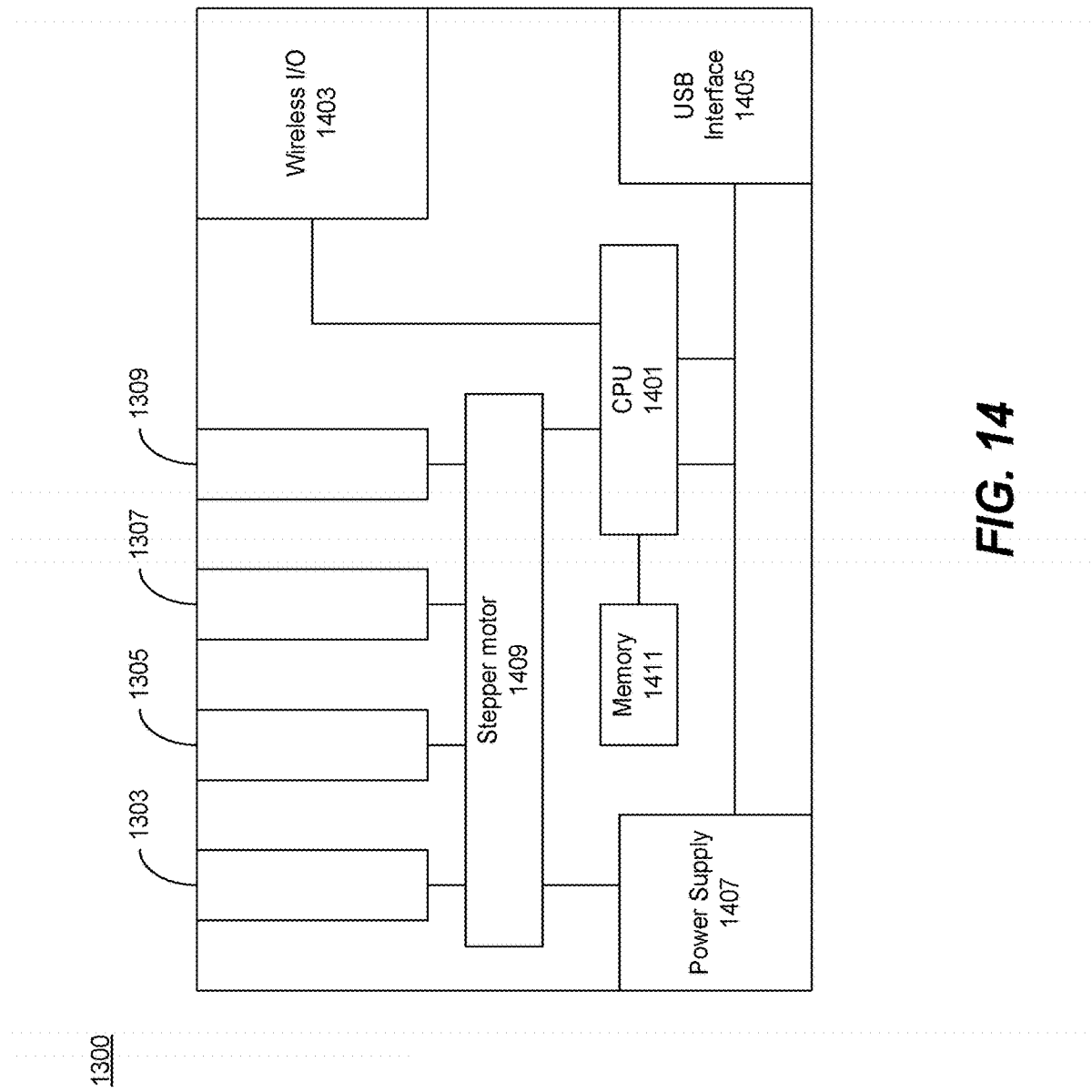
FIG. 14 is a circuit diagram of the dynamic tactile peripheral according to one or more exemplary aspects of the disclosed subject matter.

FIG. 14 is a circuit diagram of the dynamic tactile peripheral 1300. A CPU 1401 is interconnected with wireless I/O 1403, USB Interface 1405, memory 1411, and stepper motor chassis 1409. A rechargeable power supply 1407 provides power to the electronics. Four stepper motors are included in the stepper motor chassis 1409, where each stepper motor drives corresponding actuators 1303, 1305, 1307, and 1309. Each stepper motor extends/retracts its corresponding actuator in response to receiving drive pulses from the CPU 1401. In turn the CPU 1401 produces the drive pulses in response to receiving an enhanced data packet, which will be discussed in FIG. 16. The CPU interprets the data contained in the enhanced data packet and determines a number of pulses to be applied to the corresponding stepper motor, based on a stored pulse table saved in memory 1411, which sets a number of drive pulses for a corresponding received value.

The presenter can select a candidate presenter for collaboration by depressing and holding the corresponding actuator and resisting the driving force applied by the CPU to return the actuator to the former height. However, if the presenter would like target audience feedback on a joint program (the presenter's program in collaboration with the selected candidate program), the presenter can depress, but not hold, the actuator associated with the candidate. The CPU will recognize this action as a request to transmit a signal via the wireless I/O 1403 to target audience members, as will be discussed with respect to FIG. 15. As will be discussed, feedback from the target audience will be received by the presenter (via the dynamic tactile peripheral 1300) as well as the candidate collaborators. Both the presenter and all candidate collaborators will receive that feedback. In the case of the active presenter, she will receive a cumulative assessed score through the extension of the first actuator 1303. The other candidate collaborators will receive the feedback through their communication devices, and present them visually for review. Each candidate collaborator may then increase, withdraw, or decrease their collaboration bid by sending a message that is conveyed to the dynamic tactile peripheral 1300, which will adjust the height of their corresponding actuator accordingly. In this way, candidate collaborators can "up their ante" (e.g., increase their bid) in real time based on target audience reaction to the proposed collaboration.

Figure 15:
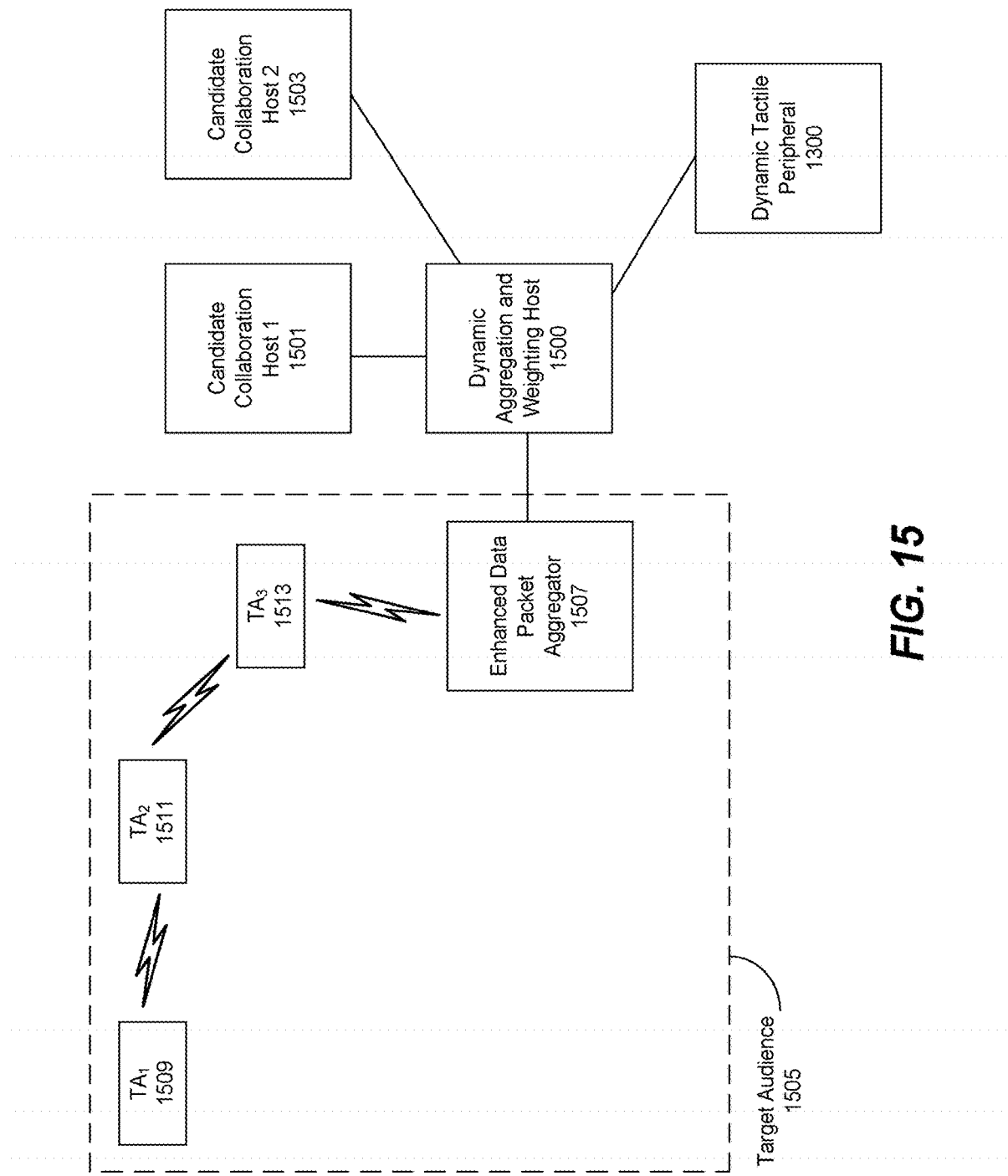
FIG. 15 is a system level view of linked system components during the presenter's presentation according to one or more exemplary aspects of the disclosed subject matter.

FIG. 15 is a system level view of linked system components during the presenter's presentation. The presenter will be wearing the dynamic tactile peripheral 1300, which in turn is connected wirelessly to a dynamic aggregation and weighting host 1500. The dynamic aggregation and weighting host 1500 is a computer that performs the vector analysis previously discussed, but also serves as a communication hub with other candidate collaboration hosts and an enhanced data packet aggregator 1507. Candidate collaboration host 1 1501 is the computer/communication resource used by a first candidate collaborator to receive feedback from the target audience, receive input regarding the value assessed to the presenter's program, and transmit a collaboration proposal signal (which includes a proposed currency value it will provide to the candidate joint program and its interest in collaborating with the presenter). Candidate collaboration host 2 operates similarly. It should be appreciated that additional candidate collaboration hosts can be included in the system.

Depending on the nature of the community service programs, in some instances the portion of the target population will have poor computer and communication networks. While the host organization can loan mobile communication devices on which the target audience can provide feedback messages regarding their reaction to the proposed programs (typically via TV or radio broadcast), it is quite possible that the communications bandwidth will be low. For this reason, communications with the target audience is not performed in parallel, but peer-to-peer, with preassigned, shortest Euclidean distance assignments. For example, communications with TA1 1509 (e.g., a tablet computer with Wi-Fi, or cellular wireless service) is through TA2 1511, and likewise TA3 1513 serves as a communications intermediary between TA2 1511 and enhanced data packet aggregator 1507, which aggregates messages from various peer-to-peer strings in the target audience region. In order to mitigate the effects of limited bandwidth, a commonly formatted data packet is relayed from one device to the next, with common information, as will be discussed with respect to FIG. 16, but an accumulated count of interest expressed by target audience members in the communication string.

FIG. 16 describes a data packet 1600. Data field 1601 includes the cumulative count, which is the expressed interest of different target audience members in the communication chain, with each member incrementing the count by a predetermined amount, e.g. 1, when they are favorably interested in the program being presented. Data field 1603 includes an identifier field for the presenter. Field 1605 includes an identifier for a particular candidate, and field 1607 includes the cumulative count for a joint collaboration between the presenter and a particular candidate collaborator. As previously mentioned, the presenter triggers a request signal to be sent to the target audience regarding their reaction to the presenter collaborating with a particular candidate collaborator. The signal is related to the devices of the target audience members and presented as a prompt for reply. The enhanced data packet aggregator collects the enhanced data packets from different strings within the target audience region and presents a single, accumulated result to the dynamic aggregation weighting host 1500, which combines the earlier assessed value for the presenter alone in combination with the cumulative result (after normalization) from the target audience regarding the proposed collaboration.

Figure 17:
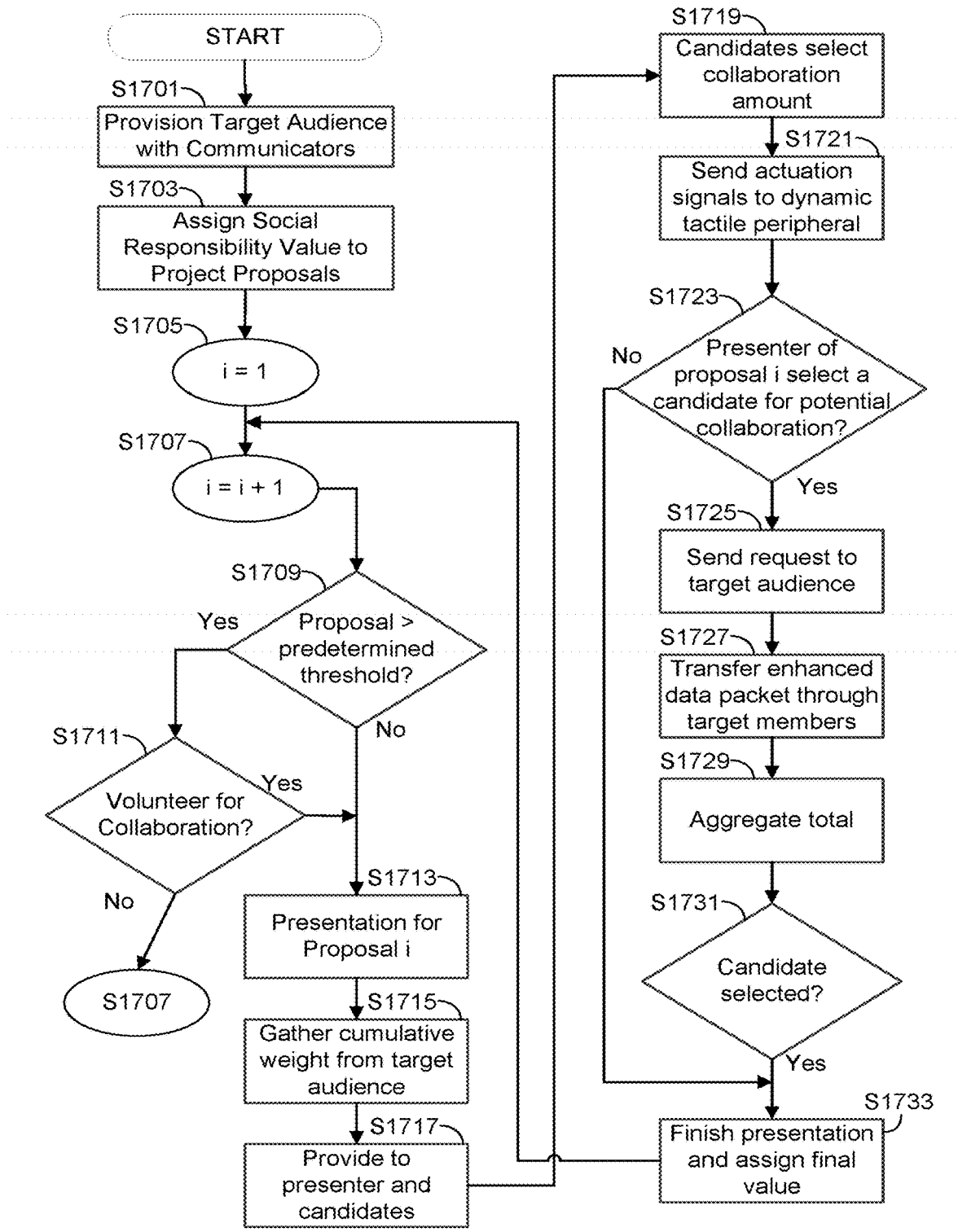
FIG. 17 is a flow diagram of a process performed by linked system components according to one or more exemplary aspects of the disclosed subject matter.

FIG. 17 is a flow diagram of a process performed by the system of FIG. 15. The process begins in step S1701, where target audience members are provisioned with communication devices (e.g., TA1, TA2, TA3 in FIG. 15). The process proceeds to step S1703 where the dynamic aggregation weighting host 1500 assigns a currency value to the project proposal of the presenter. Because there will be multiple presenters, an index is set at step S1705 and incremented at step S1707. A loop is fed back to step S1705 until all presenters have had a chance. In step S1709 a query is made regarding whether the current proposal is assessed above a predetermined value (e.g., a funding value). If so, the process proceeds to step S1711, where another inquiry is made regarding whether the presenter would nevertheless like to participate in the collaboration process. If not, the process returns to step S1707, where another presenter begins. However, when the answer to the inquiry in step S1711 is affirmative, the process proceeds in the same way as if the response to the inquiry in step S1709 is negative.

The process then proceeds to step S1713 where the current presenter begins her presentation and it continues until step S1733. During the presentation, at step S1715, the enhanced data packet aggregator 1507 passes the cumulative result of the target audience reaction to the collaboration proposal. In S1717, the dynamic aggregation and weighting host 1500 provides the candidates score alone and combined score to the presenter and the candidate collaborators. In response, in step S1719, the candidate collaborators transmit expressed collaboration values to the dynamic tactile peripheral 1300 via the dynamic aggregation and weighting host 1500. In response, in step S1721, the dynamic tactile peripheral 1300 produces actuation signals that drive the actuators on the dynamic tactile peripheral 1300 to heights that correspond with the signaled amounts.

In step S1723 a query is made regarding whether the presenter selects one of the candidates for the target audiences' reaction for potential collaboration. If the response is negative, the presentation is finished, and a final value is assigned to the program described in the presentation in step S1733, and then the process returns to step S1707. However, if the response to the query in step S1723 is affirmative, the process proceeds to step S1725, where a request message is conveyed to the target audience. In response, in step S1727 the enhanced data packet is transmitted from the target members to the dynamic aggregation and weighting host 1500, and in S1729 an updated aggregated total for the candidate collaboration is sent to the dynamic tactile peripheral 1300, where the dynamic tactile peripheral 1300 presents the information tactilely to the presenter. In step S1731, a query is made regarding whether the presenter selects the candidate, and if so a recording of the selection is made along with a registering of the respective values to the accounts of the presenter and the selected collaborator in S1733. The process then returns to step S1707 where other candidates begin their presentations.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A dynamic collaborative communication system, comprising:
   one or more remote devices;
   a dynamic aggregation and weighting host coupled to the one or more remote devices via a network, the dynamic aggregation and weighting host including processing circuitry configured to:
   receive an activity description file of a community service and contribution platform including at least one of an education and learning category, a community service category, and a social research category from the remote devices,
   calculate a social responsibility vector for the activity description file based on a plurality of social activity parameters of the activity description file,
   calculate an assessment vector based on a grade corresponding to an external assessment of the activity description file,
   generate an activity vector based on a cross-correlation of the social responsibility vector and the assessment vector, store a social responsibility contribution based on the activity vector into an account of the community service and contribution platform, output at least one of a balance of the account and a recommendation based on the social responsibility contribution of one of the one or more remote devices, receive a cumulative weight corresponding to a collaboration proposal from a target audience device via an enhanced data packet aggregator, the collaboration proposal including proposal between a presenter and one or more collaboration candidates, transmit the cumulative weight to a presenter device and remote devices of the one or more collaboration candidates, receive an indication of a collaboration amount from the remote devices of one or more collaboration candidates, transmit actuation signals to a dynamic tactile peripheral based on the received collaboration amounts, determine via actuation of the dynamic tactile peripheral when the presenter selects a candidate for potential collaboration, transmit a request to remote devices of the target audience in response to the presenter selecting the candidate for potential collaboration, relay an enhanced data packet between the remote devices of the target audience to the dynamic aggregation and weighting host, update the aggregated total for the selected candidate for potential collaboration, determine when the presenter selects the candidate for potential collaboration on the dynamic tactile peripheral, and store respective values corresponding to a selection in social responsibility accounts of the presenter and the selected candidate for potential collaboration in response to determining the candidate for potential collaboration selected by the presenter, wherein the dynamic tactile peripheral is configured to communicate with the dynamic aggregation and weighting host via a network and include processing circuitry configured to receive tactile feedback from messages sent from the remote devices of the target audience while making a presentation of a current candidate proposal, the current candidate proposal being based on the activity description file, receive one or more collaboration offers from remote devices of one or more other candidates via tactile feedback on the dynamic tactile peripheral, transmit a request to the remote devices of the target audience, receive a feedback score from the remote devices of the target audience regarding an assessed value of a combined proposal, the combined proposal including the current candidate proposal and one or more other candidate proposals from the one or more other candidates, and identify a selection corresponding to the one or more collaboration offers selected by the presenter on the dynamic tactile peripheral.

2. The dynamic collaborative communication system of claim 1, wherein a weighted value is attributed to each of the plurality of social activity parameters and the grade.

3. The dynamic collaborative communication system of claim 1, wherein the social activity parameters include at least one of graduation projects, applied projects, students' performance tasks, social scientific researches, field trips, awareness campaigns, religious activities, cultural activities, intellectual activities, art related events, sports events, environment studies, economic studies, social studies, social issues, community service, community development, survey studies, research studies, consultations, specialized meetings, private sector organizations, public sector organizations, charity organizations, awareness campaigns, workshops, lectures, symposiums, conferences, exhibitions, location of activity, estimated budget, and implementation date.

4. The dynamic collaborative communication system of claim 1, wherein the external assessment includes one or more assessments corresponding to one or more grades.

5. The dynamic collaborative communication system of claim 1, wherein the balance of the account is compared to a predetermined threshold.

6. The dynamic collaborative communication system of claim 5, wherein the processing circuitry is further configured to provide a recommendation when the balance of the account does not satisfy the predetermined threshold.

7. The dynamic collaborative communication system of claim 6, wherein the recommendation includes at least one of submit another activity description file and increase the balance of the account.

8. The dynamic collaborative communication system of claim 1, wherein the processing circuitry is further configured to store the social activity parameters and the grade of each activity description card.

9. The dynamic collaborative communication system of claim 8, wherein the recommendation is based on previously stored activity description cards.

10. A method of operating dynamic collaborative communication system, comprising:

receiving at a dynamic aggregation and weighting host coupled to one or more remote devices via a network, an activity description file of a community service and contribution platform including at least one of an education and learning category, a community service category, and a social research category from the one or more remote devices, calculating with processing circuitry a social responsibility vector for the activity description file based on a plurality of social activity parameters of the activity description file;

calculating at the dynamic aggregation and weighting host an assessment vector based on a grade corresponding to an external assessment of the activity description file;

generating at the dynamic aggregation and weighting host an activity vector based on a cross-correlation of the social responsibility vector and the assessment vector, storing a social responsibility contribution based on the activity vector into an account of the community service and contribution platform, outputting at least one of a balance of the account and a recommendation based on the social responsibility contribution of one of the one or more remote devices, receive a cumulative weight corresponding to a collaboration proposal from a target audience device via an enhanced data packet aggregator, the collaboration proposal including proposal between a presenter and one or more collaboration candidates, transmitting the cumulative weight to a presenter device and remote devices of the one or more collaboration candidates, receiving an indication of a collaboration amount from the remote devices of one or more collaboration candidates, transmitting actuation signals to a dynamic tactile peripheral based on the received collaboration amounts, determining via actuation of the dynamic tactile peripheral when the presenter selects a candidate for potential collaboration, transmitting a request to remote devices of the target audience in response to the presenter selecting the candidate for potential collaboration, relaying an enhanced data packet between the remote devices of the target audience to the dynamic aggregation and weighting host, updating the aggregated total for the selected candidate for potential collaboration, determining when the presenter selects the candidate for potential collaboration on the dynamic tactile peripheral, and storing respective values corresponding to a selection in social responsibility accounts of the presenter and the selected candidate for potential collaboration in response to determining the candidate for potential collaboration selected by the presenter, wherein the dynamic tactile peripheral communicates with the dynamic aggregation and weighting host via a network and including receiving tactile feedback from messages sent from the remote devices of the audience while making a presentation of a current candidate proposal, the current candidate proposal being based on the activity description file, receiving one or more collaboration offers from remote devices of receive one or more collaboration offers from remote devices of one or more other candidates via tactile feedback on the dynamic tactile peripheral, transmit a request to the remote devices of the target audience, receive a feedback score from the remote devices of the target audience regarding an assessed value of a combined proposal, the combined proposal including the current candidate proposal and one or more other candidate proposals from the one or more other candidates, and via tactile feedback on the dynamic tactile peripheral, transmitting a request to the remote devices of the target audience, receiving a feedback score from the remote devices of the target audience regarding an assessed value of a combined proposal, the combined proposal including the current candidate proposal and one or more of the other candidate proposals, and identifying a selection corresponding to the one or more collaboration offers selected by the presenter on the dynamic tactile peripheral.

11. The method of claim 10, wherein a weighted value is attributed to each of the plurality of social activity parameters and the grade.

12. The method of claim 10, wherein the social activity parameters include at least one of graduation projects, applied projects, students' performance tasks, social scientific researches, field trips, awareness campaigns, religious activities, cultural activities, intellectual activities, art related events, sports events, environment studies, economic studies, social studies, social issues, community service, community development, survey studies, research studies, consultations, specialized meetings, private sector organizations, public sector organizations, charity organizations, awareness campaigns, workshops, lectures, symposiums, conferences, exhibitions, location of activity, estimated budget, and implementation date.

13. The method of claim 10, wherein the external assessment includes one or more assessments corresponding to one or more grades.

14. The method of claim 10, wherein the balance of the account is compared to a predetermined threshold.

15. The method of claim 14, further comprising:
providing a recommendation when the balance of the account does not satisfy the predetermined threshold.

16. The method of claim 15, wherein the recommendation includes at least one of submit another activity description file and increase the balance of the account.

17. The method of claim 10, further comprising:
storing the social activity parameters and the grade of each activity description card.

18. The method of claim 17, wherein the recommendation is based on previously stored activity description cards.

19. A non-transitory computer storage medium having instruction stored therein that when executed processing circuitry perform a method of implementing a social responsibility bank, the method comprising:

receiving at a dynamic aggregation and weighting host coupled to one or more remote devices via a network, an activity description file of a community service and contribution platform including at least one of an education and learning category, a community service category, and a social research category from the one or more remote devices, calculating with processing circuitry a social responsibility vector for the activity description file based on a plurality of social activity parameters of the activity description file;

calculating at the dynamic aggregation and weighting host an assessment vector based on a grade corresponding to an external assessment of the activity description file;

generating at the dynamic aggregation and weighting host an activity vector based on a cross-correlation of the social responsibility vector and the assessment vector, storing a social responsibility contribution based on the activity vector into an account of the community service and contribution platform, outputting at least one of a balance of the account and a recommendation based on the social responsibility contribution of one of the one or more remote devices, receive a cumulative weight corresponding to a collaboration proposal from a target audience device via an enhanced data packet aggregator, the collaboration proposal including proposal between a presenter and one or more collaboration candidates, transmitting the cumulative weight to a presenter device and remote devices of the one or more collaboration candidates, receiving an indication of a collaboration amount from the remote devices of one or more collaboration candidates, transmitting actuation signals to a dynamic tactile peripheral based on the received collaboration amounts, determining via actuation of the dynamic tactile peripheral when the presenter selects a candidate for potential collaboration, transmitting a request to remote devices of the target audience in response to the presenter selecting the candidate for potential collaboration, relaying an enhanced data packet between the remote devices of the target audience to the dynamic aggregation and weighting host, updating the aggregated total for the selected candidate for potential collaboration, determining when the presenter selects the candidate for potential collaboration on the dynamic tactile peripheral, and storing respective values corresponding to a selection in social responsibility accounts of the presenter and the selected candidate for potential collaboration in response to determining the candidate for potential collaboration selected by the presenter, wherein the dynamic tactile peripheral communicates with the dynamic aggregation and weighting host via a network and including receiving tactile feedback from messages sent from the remote devices of the audience while making a presentation of a current candidate proposal, the current candidate proposal being based on the activity description file, receiving one or more collaboration offers from remote devices of one or more other candidates via tactile feedback on the dynamic tactile peripheral, transmitting a request to the remote devices of the target audience, receiving a feedback score from the remote devices of the target audience regarding an assessed value of a combined proposal, the combined proposal including the current candidate proposal and one or more other candidate proposals from the one or more other candidates, and identifying a selection corresponding to the one or more collaboration offers selected by the presenter on the dynamic tactile peripheral.

* * * * *